US009694800B2

(12) United States Patent
Zula et al.

(10) Patent No.: US 9,694,800 B2
(45) Date of Patent: Jul. 4, 2017

(54) SECONDARY PARKING APPARATUS FOR A HEAVY VEHICLE

(75) Inventors: Daniel P. Zula, North Ridgeville, OH (US); David J. Taneyhill, Elyria, OH (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 18 days.

(21) Appl. No.: 13/568,544

(22) Filed: Aug. 7, 2012

(65) Prior Publication Data

US 2014/0041973 A1   Feb. 13, 2014

(51) Int. Cl.
B60T 13/68 (2006.01)
B60T 13/66 (2006.01)

(52) U.S. Cl.
CPC .................. *B60T 13/662* (2013.01)

(58) Field of Classification Search
CPC .. B60T 2270/414; B60T 13/683; B60T 13/26; B60T 13/261; B60T 7/08; B60T 7/085; B60T 13/38; B60T 15/027; B60T 15/041; B60T 17/22; B60T 17/221
USPC ................ 303/122.03, 122.04, 122.05, 22.4; 188/106 P
See application file for complete search history.

(56) References Cited

U.S. PATENT DOCUMENTS

| | | |
|---|---|---|
| 5,171,069 A | 12/1992 | Peck et al. |
| 6,126,244 A | 10/2000 | Fries |
| 6,305,511 B1 | 10/2001 | McCann et al. |
| 6,450,587 B1 | 9/2002 | MacGregor et al. |
| 7,359,786 B2 * | 4/2008 | Lindqvist ........................ 701/70 |
| 7,690,735 B2 | 4/2010 | Bennett |
| 2004/0140710 A1 * | 7/2004 | Alvarez ................. B60T 7/042 303/20 |
| 2008/0309154 A1 * | 12/2008 | Hilberer ......................... 303/15 |
| 2009/0195058 A1 | 8/2009 | Jackson et al. |
| 2010/0025141 A1 * | 2/2010 | Bensch et al. ............... 180/271 |

(Continued)

FOREIGN PATENT DOCUMENTS

EP   234290 A2 *   9/1987
WO   WO03095279 A1   11/2003

OTHER PUBLICATIONS

Bendix Commercial Vehicle Systems LLC, BW7506 Bendix Eversure Spring Brake with No Touch Technology, service data sheet, Aug. 2011, 8 pages, United States of America.

*Primary Examiner* — Bradley King
*Assistant Examiner* — Stephen Bowes
(74) *Attorney, Agent, or Firm* — Cheryl L. Greenly; Brian E. Kondas; Eugene E. Clair

(57) ABSTRACT

A secondary parking apparatus is provided for a vehicle having components of a parking brake system, components of an anti-lock brake system (ABS), and a manually-operable device. The secondary parking apparatus comprises an electronic controller arranged to (i) monitor the manually-operable device to detect an operator intent signal to apply parking brakes of the parking brake system, (ii) receive a combination of one or more signals indicative of a fault condition of the vehicle, and (iii) provide one or more control signals to be applied to components of the ABS to selectively exhaust air pressure from components of the ABS to atmosphere so that parking brakes of the parking brake system are applied to park the vehicle when both the operator intent signal and the combination of one or more signals indicative of a fault condition of the vehicle are detected.

9 Claims, 3 Drawing Sheets

(56) References Cited

U.S. PATENT DOCUMENTS

2010/0181823 A1 7/2010 Eberling
2010/0252378 A1 10/2010 Hilberer
2011/0198164 A1 8/2011 Potter et al.

* cited by examiner

SECONDARY PARKING APPARATUS FOR A HEAVY VEHICLE

BACKGROUND

The present application relates to heavy vehicle parking, and is particularly directed to a secondary parking apparatus for a heavy vehicle such as a truck.

Vehicle parking systems for trucks are known. One type of vehicle parking system for trucks is an electronic park system. In some electronic park systems, electrical lines are used in place of pneumatic lines in the dashboard area of the truck. It would be desirable to provide a redundant parking mechanism for electronic park systems for trucks.

SUMMARY

In accordance with one embodiment, a secondary parking apparatus is provided for a vehicle having components of a parking brake system, components of an anti-lock brake system (ABS), and a manually-operable device for, when operated by a vehicle operator, providing an operator intent signal indicative of the vehicle operator's intent to apply parking brakes of the parking brake system. The secondary parking apparatus comprises a first electronic controller arranged to (i) monitor the manually-operable device to detect an operator intent signal, and (ii) provide one or more parking control signals to be applied to components of the parking brake system to apply the parking brakes when an operator intent signal is detected. The secondary parking apparatus also comprises a second electronic controller arranged to (i) monitor the manually-operable device to detect an operator intent signal, (ii) receive a combination of one or more signals indicative of a fault condition of the vehicle, and (iii) provide one or more control signals to be applied to components of the ABS to selectively control components of the ABS to selectively exhaust air pressure from the compressed air supply so that parking brakes of the parking brake system are applied to park the vehicle when both the operator intent signal and the combination of one or more signals indicative of a fault condition of the vehicle are detected.

DETAILED DESCRIPTION

Figure 1:
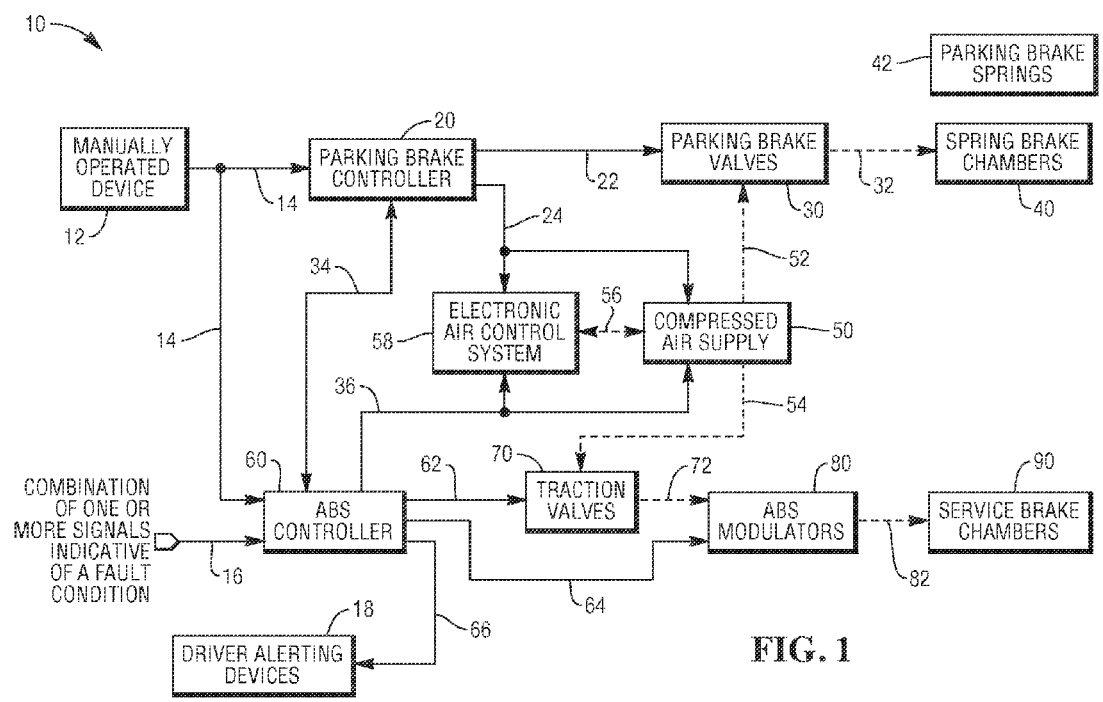
FIG. 1 is a schematic block diagram showing a secondary parking apparatus constructed in accordance with an embodiment.

Referring to FIG. 1, secondary parking apparatus 10 is provided for use in a heavy vehicle such as a truck. Secondary parking apparatus 10 is constructed in accordance with one embodiment. In FIG. 1, electrical line connections are shown as solid lines, and pneumatic lines connections are shown as dashed lines.

Device 12 is operable by an operator such as a driver of the vehicle. When device 12 is manually operated by the vehicle driver, device 12 provides at least one signal on line 14 indicative of the vehicle driver's intent to apply parking brakes of the vehicle. Device 12 may comprise a switch of an integrated switching module which is mounted on a dashboard of the vehicle. Device 12 may comprise any electrical, pneumatic, or electropneumatic device which can be operated by an operator such as the vehicle driver.

Parking brake controller 20 monitors signal on line 14 from device 12 indicative of the vehicle driver's intent to apply parking brakes of the vehicle. Parking brake controller 20 provides one or more control signals on line 22 to control operation of parking brakes of the vehicle. More specifically, parking brake controller 20 provides signals on line 22 to control operation of parking brake valves 30. Compressed air supply 50 provides a source of compressed air in line 52 to parking brake valves 30. Parking brake valves 30 are controlled by parking brake controller 20 to vary pneumatic pressure in line 32 to one or more chambers of spring brake chambers 40.

When the vehicle driver desires to apply parking brakes of the vehicle, the driver operates device 12. Parking brake controller 20 provides signals on line 22 in response to receiving signal on line 14 indicative of the driver's intent to apply parking brakes of the vehicle. Signals on line 22 are applied to parking brake valves 30 so as to exhaust air in one or more chambers of spring brake chambers 40 which are operatively coupled in known manner to parking brake springs 42. When air in spring brake chambers 40 is exhausted and/or system air pressure drops to less than about 45 psi to 60 psi, parking brake springs 42 are automatically applied without any human intervention to apply the vehicle parking brakes, as is known. Structure and operation of parking brake controller 20 and parking brake valves 30 for controlling operation of spring brake chambers 40 and parking brake springs 42 to park the vehicle are conventional and, therefore, will not be further described.

Parking brake controller 20 also applies one or more signals on line 24 to electronic air control system 58 which is connected via line 56 to compressed air supply 50. Parking brake controller 20 provides one or more signals on line 24 to control a governing device (not shown) for compressed air supply 50 and/or electronic air control system 58 so that system air pressure does not rebuild until after a fault condition of the vehicle and any diagnostic trouble codes are corrected. Structure and operation of electronic air control systems and compressed air supplies are known and, therefore, will not be described.

Anti-lock braking system (ABS) controller 60 communicates with parking brake controller 20 via line 34. ABS controller 60 can also be used in traction or stability control systems. ABS controller 60 applies one or more signals on line 62 to control operation of service brakes of the vehicle. More specifically, ABS controller 60 provides signals on line 62 to control operation of traction valves 70 and signals on line 64 to control operation of ABS modulators 80 in response to one or more signals from wheel speed sensors (not shown), as is known.

ABS controller 60 also applies one or more signals on line 36 to electronic air control system 58 and/or to a governing device (not shown) for the compressed air supply 50. Compressed air supply 50 provides a source of compressed air in line 54 to traction valves 70. Traction valves 70 are controlled by ABS controller 60 to vary pneumatic pressure in line 72 to one or more ABS modulators 80. ABS controller 60 also applies one or more signals on line 64 to ABS modulators 80.

In response to one or more signals on line 72 and one or more signals on line 64, ABS modulators 80 are controlled by ABS controller 60 to vary pneumatic pressure in line 82 to one or more chambers of service brake chambers 90. Service brake chambers 90 and spring brake chambers 40 may comprise an all-in-one brake actuator. As an example, the brake actuator may comprise EverSure™ spring brake available from Bendix Spicer Foundation Brake LLC located Elyria, Ohio. ABS controller 60, traction valves 70, and ABS modulators 80 comprise part of a conventional ABS system, as is known. Structure and operation of ABS systems to control service brakes are known and, therefore, will not be described.

In accordance with one embodiment, ABS controller 60 receives signal on line 14 from device 12 indicative of the vehicle driver's intent to apply parking brakes of the vehicle. ABS controller 60 also receives a combination of one or more signals on line 16. The combination of one or more signals on line 16 is indicative of a fault condition of the vehicle. An example fault condition includes loss of electrical communication with parking brake valves 30. Another example fault condition includes a short or open circuit anywhere in the parking control circuit. Still another example fault condition includes loss of activation means to parking brake valves 30 such that the valves stop working. These are example fault conditions, and other fault conditions are possible.

ABS controller 60 provides signal on line 66 to one or more driver alerting devices 18. Driver alerting devices 18 may include any combination of audio, visual, and haptic devices, for examples. ABS controller 60 provides signals on line 62 and line 64 to control operation of traction valves 72 and ABS modulators 80 and thereby to control operation of parking brake springs 42 to apply the vehicle parking brakes in accordance with a method to be described hereinbelow.

Figure 2:
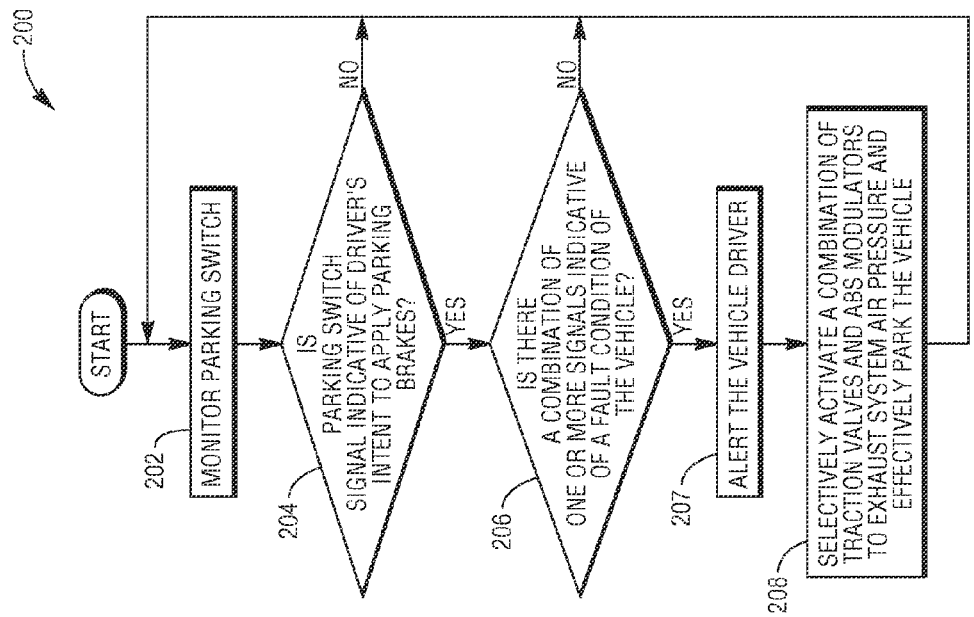
FIG. 2 is a flow diagram depicting operation of a secondary parking apparatus in accordance with an embodiment.

Referring to FIG. 2, flow diagram 200 depicts operation of secondary parking apparatus 10 of FIG. 1 in accordance with an embodiment. In step 202, ABS controller 60 monitors signal on line 14 from device 12. A determination is made in step 204 as to whether signal on line 14 indicative of the vehicle driver's intent to apply parking brakes of the vehicle is detected. If determination in step 204 is negative (i.e., there is no indication of the vehicle driver intending to apply parking brakes of the vehicle), the process returns to step 202 to continue monitoring signal on line 14 from switch 12. However, if determination in step 204 is affirmative (i.e., there is an indication of the vehicle driver intending to apply parking brakes of the vehicle), the process proceeds to step 206.

In step 206, a determination is made as to whether there is a combination of one or more signals on line 16 indicative of a fault condition of the vehicle. If determination in step 206 is negative (i.e., there is no indication of a fault condition of the vehicle), the process returns to step 202 to continue monitoring signal on line 14 from switch 12. However, if determination in step 206 is affirmative (i.e. there is an indication of a fault condition of the vehicle), ABS controller 60 provides one or more signals on line 66 to operate driver alerting devices 18. Thereby, in step 207, the driver is alerted of the fault condition.

In step 208, ABS controller 60 applies one or more signals on line 62 and one or more signals on line 64 to control traction valves 70 and ABS modulators 80 to selectively activate a combination of a number of traction valves and a number of ABS modulators to rapidly exhaust system air pressure. By exhausting system air pressure, air in spring brake chambers 40 is rapidly depleted. When air in spring brake chambers 40 is depleted to less than about 45 psi to 60 psi, parking brake springs 42 are automatically applied to park the vehicle without any driver intervention.

As an example, ABS controller 60 may selectively activate a combination of traction valves and ABS modulators associated with the same axle of the vehicle to selectively exhaust air pressure from these components on this vehicle axle. As another example, ABS controller 60 may selectively activate a combination of at least some traction valves and ABS modulators associated with one axle and at least some traction valves and ABS modulators associated with a different vehicle axle. Accordingly, as an example, it is conceivable that an ABS modulator located at one corner of the vehicle and an ABS modulator located at an opposite corner of the vehicle may be controlled to exhaust air pressure therefrom at the same time or in a predetermined manner such as in a predetermined sequence.

As an example scenario, if the vehicle driver's foot is not pressing on a brake pedal of the vehicle, all ABS modulators may be activated to exhaust air to atmosphere. However, if the vehicle driver's foot is pressing on the brake pedal, one or more ABS modulators may be activated in a predetermined sequence to exhaust air to atmosphere (using the opposite side on different axles). By selectively exhausting air to atmosphere from ABS modulators in this manner, the vehicle driver maintains the ability to operate the vehicle service brakes at the same time the system air pressure is being exhausted to apply the vehicle parking brakes.

It should be apparent that traction valves 70 and ABS modulators 80 are selectively controlled to exhaust air pressure to atmosphere in a manner to apply parking brake springs of the vehicle to effectively park the vehicle during the fault condition. More specifically, ABS controller 60 provides one or more control signals on line 62 and line 64 to selectively control a combination of one or more of traction valves 70 and ABS modulators 80 to selectively exhaust system air pressure to atmosphere in a predetermined manner (such as in a predetermined sequence) so that parking brake springs 42 are applied to park the vehicle.

Program instructions for enabling ABS controller 60 shown in FIG. 1 to perform operation steps in accordance with flow diagram 200 shown in FIG. 2 may be embedded in memory internal to ABS controller 60. Alternatively, or in addition to, program instructions may be stored in memory external to ABS controller 60. As an example, program instructions may be stored in memory internal to a different electronic controller of the vehicle. Program instructions may be stored on any type of program storage media including, but not limited to, external hard drives, flash drives, and compact discs. Program instructions may be reprogrammed depending upon features of the particular ABS controller.

Figure 3:
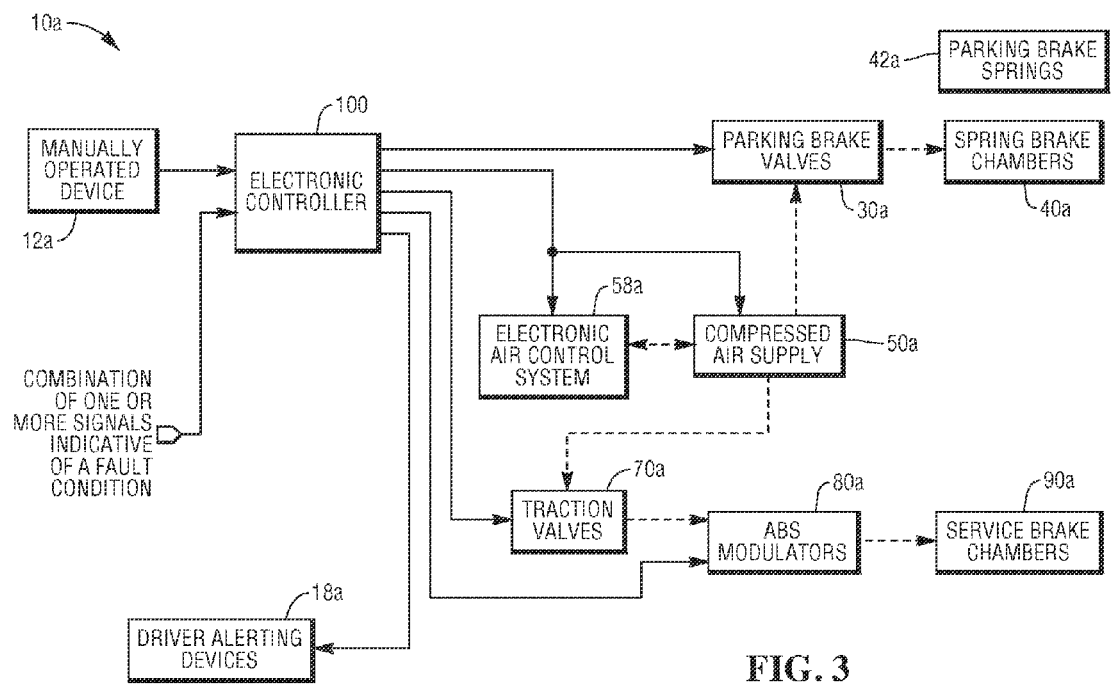
FIG. 3 is a schematic block diagram showing a secondary parking apparatus constructed in accordance with another embodiment.

A second embodiment of a secondary parking apparatus is illustrated in FIG. 3. Since the embodiment illustrated in FIG. 3 is generally similar to the embodiment illustrated in FIG. 1, similar numerals are utilized to designate similar components, the suffix letter "a" being associated with the embodiment of FIG. 3 to avoid confusion.

Secondary parking apparatus 10a comprises single electronic controller 100. Single electronic controller 100 controls operation of parking brake valves 30a and spring brake chambers 40a in response to signal from switch 12a in similar manner that parking brake controller 20 controls parking brake valves 30 and spring brake chambers 40 in response to signal from switch 12 as described hereinabove in the embodiment of FIG. 1. Single electronic controller 100 controls operation of traction valves 70a, ABS modulators 80a and thereby the operation of service brake chambers 90a, and parking brake springs 42a in response to signal from device 12a and the combination of one or more signals indicative of a fault condition of the vehicle in similar manner that ABS controller 60 as described hereinabove in the embodiment of FIG. 1.

Single electronic controller 100 controls operation of compressed air supply 50a and/or electronic air control system 58a in similar manner that parking brake controller 20 controls compressed air supply 50 and/or electronic air control system 58 as described hereinabove in the embodiment of FIG. 1. Single electronic controller 100 controls operation of driver alerting devices 18a in similar manner that ABS controller 60 controls operation of driver alerting devices 18 as described hereinabove in the embodiment of FIG. 1.

It should be apparent that the above-described operation of the ABS system provides a function similar to a driver fanning the brakes, but is quicker and automated in response to detecting a fault condition of the vehicle and the vehicle driver's intent to apply parking brakes of the vehicle. It should also be apparent that a redundant parking mechanism is provided for an electronic park system without addition of pneumatic components or electronic components. Accordingly, a redundant parking mechanism is provided at relatively low cost.

Although the above description describes controlling traction valves 70, 70a to exhaust system air pressure, it is conceivable that one or more electropneumatic valves may be located upstream of traction valves 70, 70a and controlled to exhaust system air pressure. It is also conceivable that one or more electropneumatic valves may be used in place of traction valves 70, 70a and controlled to exhaust system air pressure.

Also, although the above description describes use of one electronic controller or use of two different electronic controllers, it is conceivable that any number of electronic controllers may be used. Moreover, it is conceivable that any type of electronic controller may be used. Suitable electronic controllers for use in vehicles are known and, therefore, have not been described.

Further, although the above description describes parking brakes being applied in response to a vehicle driver operating manually-operable device 12, 12a, it is conceivable that the vehicle parking brakes be applied in response to another means by which the vehicle driver or fleet operator can send a request to park the vehicle. As an example, it is conceivable that the vehicle parking brakes be applied in response to the vehicle driver operating a key fob. Moreover, it is conceivable that the parking brakes be applied in response to an operator who is other than the vehicle driver operating a device which is other than a switch on the vehicle. As an example, it is conceivable that the vehicle parking brakes be applied in response to a remote operator communicating via satellite to send a request to park the vehicle.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A secondary parking apparatus for a vehicle comprising:
    a single electronic controller arranged to
        (i) monitor a manually-operable switch of an integrated switching module of a parking brake system to detect an operator intent signal indicative of the operator's intent to apply parking brakes,
        (ii) provide one or more parking control signals to be applied to at least one parking brake valve of the parking brake system to apply the parking brakes when the operator intent signal is detected,
        (iii) receive a combination of one or more signals indicative of a fault condition of the parking brake system of the vehicle,
        (iv) monitor a service brake pedal sensor to detect a signal indicative of the operator depressing the service brake pedal to activate a service brake system, and
        (iv) provide one or more traction valve and ABS modulator control signals to be applied to at least one traction valve and ABS modulator of the service brake system in response to the operator intent signal indicative of the operator's intent to apply parking brakes, the signal indicative of the operator depressing the service brake pedal and the one or more signals indicative of a fault condition to selectively control the at least one traction valve and ABS modulator to selectively exhaust air pressure from the at least one traction valve and ABS modulator to the atmosphere in a predetermined manner so that parking brake springs of the parking brake system are applied to park the vehicle when both the operator intent signal and the combination of one or more signals indicative of a fault condition of the parking brake system of the vehicle are detected.

2. A secondary parking apparatus according to claim 1, wherein the single electronic controller arranged to provide the one or more traction valve and ABS modulator control signals to selectively control the at least one traction valve and ABS modulator to selectively exhaust air pressure from the at least one ABS modulator to the atmosphere in a predetermined manner includes the single electronic controller arranged to provide the one or more traction valve and ABS modulator control signals to selectively control a combination of traction valves and ABS modulators to selectively exhaust system air pressure to atmosphere in a predetermined sequence.

3. A secondary parking apparatus according to claim 1, wherein the single electronic controller is further arranged to provide an alert control signal to be applied to an operator alert device when both the operator intent signal and the combination of one or more signals indicative of a fault condition of the vehicle are detected.

4. A secondary parking apparatus according to claim 1, wherein the single electronic controller is further arranged to provide a control signal to be applied to a governing device of an electronic air control system in response to the operator intent signal indicative of the operator's intent to apply parking brakes and the one or more signals indicative of a fault condition so that the electronic air control system is prevented from rebuilding system pressure.

5. A method for parking a vehicle using a service brake system, the method comprising the steps of:
    receiving a signal indicative of a vehicle operator's intent to apply parking brakes of a parking brake system;

receiving a signal indicative of a fault condition of a parking brake valve of the parking brake system;

providing a signal to be applied to the parking brake valve to apply the parking brakes in response to the signal indicative of the vehicle operator's intent to apply parking brakes being received;

receiving a signal indicative of an operator actuating the service brakes of the vehicle; and providing a signal to be applied to a service brake system independent of the parking brake system to selectively control at least one traction valve and ABS modulator of the service brake system to selectively exhaust air pressure from the at least one traction valve and ABS modulator so that parking brakes of the parking brake system are applied to park the vehicle in response to the signal being applied to the parking brake valve to apply the parking brakes, the signal indicative of the operator actuating the service brakes, and the parking brake system unable to park the vehicle using the parking brake valve due to the fault condition of the valve of the parking brake system so that parking brake springs of the parking brake system are applied to park the vehicle.

6. The method according to claim 5, wherein providing the signal to selectively control the at least one traction valve and ABS modulator to selectively exhaust air pressure from the at least one ABS modulator to the atmosphere in a predetermined manner includes providing the signal to selectively control a combination of traction valves and ABS modulators of the ABS to selectively exhaust system air pressure to the atmosphere in a predetermined sequence.

7. The method according to claim 5, wherein providing the signal to selectively control the at least one traction valve and ABS modulator to selectively exhaust air pressure from the at least one traction valve and ABS modulator to the atmosphere in a predetermined manner includes providing the signal to selectively control a combination of traction valves and ABS modulators of the ABS to selectively exhaust system air pressure to the atmosphere in a predetermined sequence occurs at the same time as the vehicle operator is pressing on a brake pedal of the vehicle to apply the service brakes.

8. The method according to claim 5, wherein the method further includes the step of:

providing a signal to be applied to an operator alert device in response to the signal being applied to the ABS to selectively control the at least one of the traction valve and the ABS modulator.

9. The method according to claim 5, wherein the method further includes the step of:

providing a signal in response to the signal being applied to the ABS to be applied to an electronic air control system so that the electronic air control system is prevented from rebuilding system pressure.

* * * * *